United States Patent
Amano et al.

(10) Patent No.: US 6,440,040 B1
(45) Date of Patent: Aug. 27, 2002

(54) VEHICULAR AUTOMATIC TRANSMISSION EQUIPPED WITH FAILURE DETECTING APPARATUS

(75) Inventors: Mitsuo Amano; Toru Futawatari, both of Shizuoka (JP)

(73) Assignee: Jatco Transtechnology Ltd., Fuji (JP)

( * ) Notice: Subject to any disclaimer, the term of this patent is extended or adjusted under 35 U.S.C. 154(b) by 0 days.

(21) Appl. No.: 09/634,003

(22) Filed: Aug. 7, 2000

(30) Foreign Application Priority Data

Aug. 6, 1999 (JP) ............................................ 11-223337

(51) Int. Cl.$^7$ .............................................. F16H 59/64
(52) U.S. Cl. ......................................... 477/98; 477/906
(58) Field of Search ................................ 475/119, 121, 475/122; 477/98, 906

(56) References Cited

U.S. PATENT DOCUMENTS

| | | | | |
|---|---|---|---|---|
| 4,635,508 A | * | 1/1987 | Tasumi ..................... | 477/906 X |
| 4,733,581 A | * | 3/1988 | Hasegawa et al. ............ | 477/98 |
| 4,955,258 A | * | 9/1990 | Ito et al. .................. | 477/906 X |
| 4,965,730 A | * | 10/1990 | Kurihara et al. ......... | 477/906 X |
| 5,191,815 A | * | 3/1993 | Kouta .................... | 477/906 X |
| 5,409,434 A | * | 4/1995 | Furukawa et al. ....... | 477/906 X |
| 5,460,582 A | * | 10/1995 | Palansky et al. ......... | 477/906 X |
| 5,499,952 A | * | 3/1996 | Huber et al. ............ | 477/906 X |
| 5,941,794 A | * | 8/1999 | Jang ....................... | 477/906 X |
| 6,102,826 A | * | 8/2000 | Takahashi et al. ....... | 477/906 X |

FOREIGN PATENT DOCUMENTS

JP 8-121586 5/1996

* cited by examiner

Primary Examiner—Rodney H. Bonck
Assistant Examiner—Roger Pang
(74) Attorney, Agent, or Firm—Foley & Lardner

(57) ABSTRACT

In a vehicular automatic transmission of an engaging pressure electronically controlled type, a failures detecting apparatus is installed to detect an occurrence of failure of a hydraulic switching device such as a hydraulic switching valve and includes: a gear range determinator to determine in which gear range the present gear range of the automatic transmission falls; a failure detection start determinator to determine a start of the failure detection of the hydraulic switching device according to a result of determination by the gear range determinator; a memory storing parts of a plurality of engaging elements which are selected as the combinations of engagement for the respective gear ranges and other parts than those for the respective gear ranges in a table form; a hydraulic switching device checking device to intentionally output an engagement command signal to command to engage to each of the other parts of engaging elements which are not to be engaged and which are read from the memory; and a hydraulic switching device abnormality state determinator to determine through the checking device whether the hydraulic switching device is in an abnormal state depending on whether the hydraulic is transmitted to a corresponding one of the other parts of engaging elements in response to the engagement command signal.

16 Claims, 8 Drawing Sheets

FIG.2

| CLUTCH / GEAR RANGE | LOW/C | 2-4/B | H/C | L&R/B | R/C |
|---|---|---|---|---|---|
| 1-ST SPEED RANGE | ○ | × | × | × | × |
| 2-ND SPEED RANGE | ○ | ○ | × | × | × |
| 3-RD SPEED RANGE | ○ | × | ○ | × | × |
| 4-TH SPEED RANGE | × | ○ | ○ | × | × |
| ENGINE BRAKING AT 1-ST SPEED | ○ | × | × | ○ | × |
| REVERSE RANGE | × | × | × | ○ | ○ |

○ ··· ENGAGE

× ··· RELEASE

| SOLENOID | LOW/C SOL | 2-4/B SOL | H/C SOL | L&R/B SOL |
|---|---|---|---|---|
| 1-ST SPEED RANGE | ○ | × | × | × |
| 2-ND SPEED RANGE | ○ | ○ | × | △ |
| 3-RD SPEED RANGE | ○ | × | ○ | △ |
| 4-TH SPEED RANGE | × | ○ | ○ | △ |
| ENGINE BRAKING AT 1-ST SPEED | ○ | × | × | ○ |
| REVERSE RANGE | × | × | × | ○ |

··· NON SUPPLY OF POWER

··· POWER SUPPLY (INTERMEDIATE VALUE)

··· POWER SUPPLY (100%)

a : HYDRAULIC PRESSURE WITH THE HYDRAULIC PRESSURE SW NOT TURNED ON b : HYDRAULIC PRESSURE WITH THE HYDRAULIC PRESSURE SW ALWAYS TURNED ON c : TIME DURATION LONGER THEN A CHATTERING TIME DURATION d : RAMP PRESSURE e : DISPLAY TIME f : RAMP TIME TIMED OUT

FIG.8

| SOLENOID | LOW/C SOL | 2-4/B SOL | H/C SOL | L&R/B SOL |
|---|---|---|---|---|
| 1-ST SPEED RANGE | ◯ | ✕ | ✕ | ✕ |
| 2-ND SPEED RANGE | ◯ | ◯ | ✕ | ✕ |
| 3-RD SPEED RANGE | ◯ | △ | ◯ | ✕ |
| 4-TH SPEED RANGE | ✕ | ◯ | ◯ | ✕ |
| ENGINE BRAKING AT 1-ST SPEED | ◯ | ✕ | ✕ | ◯ |
| REVERSE RANGE | ✕ | ✕ | ✕ | ◯ |

◯ ··· NON SUPPLY OF POWER

△ ··· POWER SUPPLY (INTERMEDIATE VALUE)

✕ ··· POWER SUPPLY (100%)

VEHICULAR AUTOMATIC TRANSMISSION EQUIPPED WITH FAILURE DETECTING APPARATUS

BACKGROUND OF THE INVENTION:

a) Field of the Invention

The present invention relates generally to a vehicular automatic transmission equipped with a failure detecting apparatus. The present invention, more particularly, relates to a technique on a hydraulic circuit of the vehicular automatic transmission of an engaging pressure electronically controlled type in which the hydraulic circuit is simplified, the number of assembled parts are reduced, and a reduction in size of a control valve body is achieved.

b) Description of the Related Art

A Japanese Patent Application First Publication No. Heisei 8-121586 published on May 14, 1996 exemplifies a previously proposed hydraulic control apparatus for the vehicular automatic transmission of the engaging pressure electronically controlled type.

In the previously proposed vehicular automatic transmission disclosed in the above-identified Japanese Patent Application Publication, as a fail-safe valve of an LR (low-and-reverse) brake which is clutched when a gear range is a first-speed D (Drive) range and is released when the gear range is a second-speed, a third-speed, or a fourth-speed D range, a forceful hydraulic drain structure is disposed which forcefully drains the hydraulic supplied to the LR brake at a time of the gear range is in the D range second-speed, third-speed, and fourth-speed at which the hydraulic in at least one of either a 2-nd brake pressure P2ND or an OD (Overdrive) clutch pressure POD is developed, the 2-nd brake pressure P2ND being the hydraulic for a 2-nd-brake to be clutched at the time of D range 2-nd or 4-th speed and the OD clutch pressure POD being the hydraulic for an OD clutch to be engaged at the time of D range 3-rd or 4-th speed.

SUMMARY OF THE INVENTION:

However, in the previously proposed hydraulic control apparatus for the vehicular automatic transmission, no detection means is provided to detect whether a first spool which constitutes the forceful hydraulic drain structure is stuck (or a sticky slip occurs). If the first spool is stuck at a position where the OD clutch pressure POD enters, the LR brake would be engaged and would be interlocked due to the stick on the first spool if the abnormality occurs in a hydraulic system on the LR brake pressure and the undesired hydraulic is developed.

It is, hence, an object of the present invention to provide the vehicular automatic transmission of the engaging pressure electronically controlled type with which a failure detecting apparatus is equipped and the failure detecting apparatus can achieve such a fail-safe operation as to forcefully drain an engagement element pressure at a most appropriate timing neither giving an ill effect on a gear shift control nor developing the interlock under an occurrence of the failure and which can check to see if this fail-safe operation is always achieved without failure.

The above-described object can be achieved by providing a vehicular automatic transmission, comprising: a plurality of engaging elements; a shift gear mechanism in which combinations of engagement and release of the respective engaging elements are selected by means of hydraulic control section so as to perform a multiple range of gear shift; a hydraulic switching device that is installed in the hydraulic control section to prevent the shift gear mechanism from being interlocked; and a failure detecting apparatus to detect an occurrence of failure of the hydraulic switching device, the failure detecting apparatus including: a gear range determinator to determine in which gear range the present gear range of the automatic transmission falls; a failure detection start determinator to determine a start of the failure detection of the hydraulic switching device according to a result of determination by the gear range determinator; a memory storing parts of the engaging elements which are selected as the combinations of engagement for the respective gear ranges and other parts than those for the respective gear ranges in a table form; a hydraulic switching device checking device to intentionally output an engagement command signal to command to engage to each of the other parts of engaging elements which are not to be engaged and which are read from the memory; and a hydraulic switching device abnormality state determinator to determine through the checking device whether the hydraulic switching device is in an abnormal state depending on whether the hydraulic is transmitted to a corresponding one of the other parts of engaging elements in response to the engagement command signal.

BRIEF DESCRIPTION OF THE DRAWINGS

FIG. 2 is a logic table on an engagement of each speed range at an R (reverse) range and a D (drive) range in the vehicular automatic transmission to which the failure detecting apparatus according to the present invention is applicable.

FIG. 8 is a logic table representing the power supply state to a 2–4 brake solenoid described in the preferred embodiment.

DETAILED DESCRIPTION OF THE PREFERRED EMBODIMENT

Reference will hereinafter be made to the drawings in order to facilitate a better understanding of the present invention.

Figure 1:
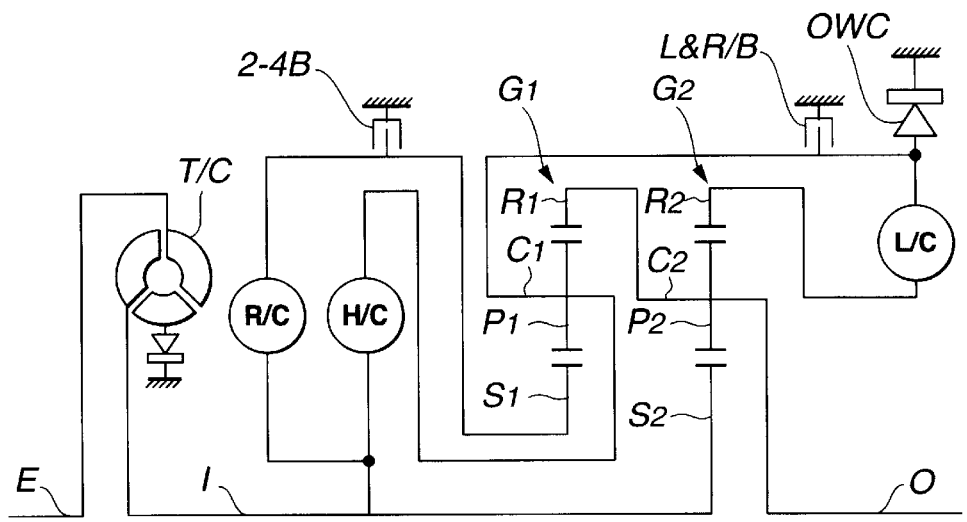
FIG. 1 is a schematic connection diagram of a gear-train in a vehicular automatic transmission to which a failure detecting apparatus in a preferred embodiment according to the present invention is applicable.

FIG. 1 shows one example of a gear train of a vehicular automatic transmission to which a hydraulic control apparatus in a preferred embodiment according to the present invention is applicable.

In FIG. 1, E denotes an engine output axle, I denotes a transmission input axle, and O denotes a transmission output axle. A torque converter T/C is interposed between the engine output axle E and the transmission input axle I. A first planetary gear group G1 and a second planetary gear group G2 are interposed between the input and output axles I and O of the automatic transmission.

The first planetary gear group G1 is a simple planetary gear group having a first pinion P1, a first carrier C1, a first pinion P1, a first carrier C1, a first sun gear S1, and a first ring gear R1 and a second planetary gear group G2 is a simple planetary gear group G2 having a second pinion P2, a second carrier C2, a second sun gear S2, and a second ring gear R2.

The transmission input axle I and the second sun gear S2 are directly coupled. A reverse clutch R/C is installed in a midway through a member linking the transmission input axle I to the first sun gear S1.

A 2–4 brake 2–4/B of a multi-plate brake structure is installed so as to enable this member to be fixed onto the casing. A high clutch H/C is installed in a midway through a member linking the transmission input axle I to the first carrier C1. A Low Clutch L/C is installed in a midway through a member linking the first carrier C1 to the second ring gear R2. A Low & Reverse brake L & R/B of a multi-plate structure so as to enable this member to be fixed onto the casing is installed. A one-way clutch OWC disposed in parallel to the Low & Reverse brake L & R/B. The first ring gear R1 and the second carrier C2 are directly coupled. The transmission output axle O is linked to the second carrier C2.

FIG. 2 shows an engagement logic table at each gear range in a reverse range (also called, R range) and in a drive range (also called, D range).

It is noted that ï mark denotes the engagement state and x mark denotes the release state.

At the time of R range, the reverse clutch R/C and the low & reverse brake L & R/B are engaged to each other.

The Low clutch L/C is engaged at the first-speed of D range.

At the second speed of D range, both the low clutch L/C and 2–4 brake 2–4/B are engaged.

At the third-speed of D range, both low clutch L/C and a high clutch H/C are engaged.

In the fourth-speed of D range, the high clutch H/C and 2–4 brake 2–4/B are clutched. It is noted that during the first-speed (engine braking is effected at the first-speed range) in a HOLD mode in a low range (hereinafter, L range), the low clutch L/C and the low & reverse clutch (L & R/B) are engaged.

Figure 4B:
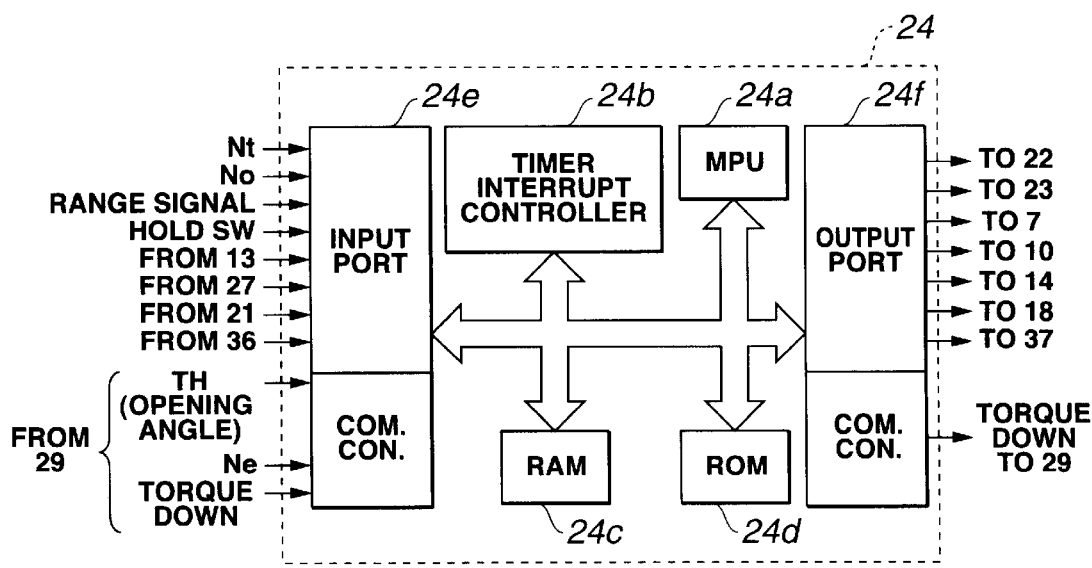
FIG. 4B is a schematic circuit block diagram of an automatic transmission control unit in the electronic control system shown in FIG. 4A.
Figure 4A:
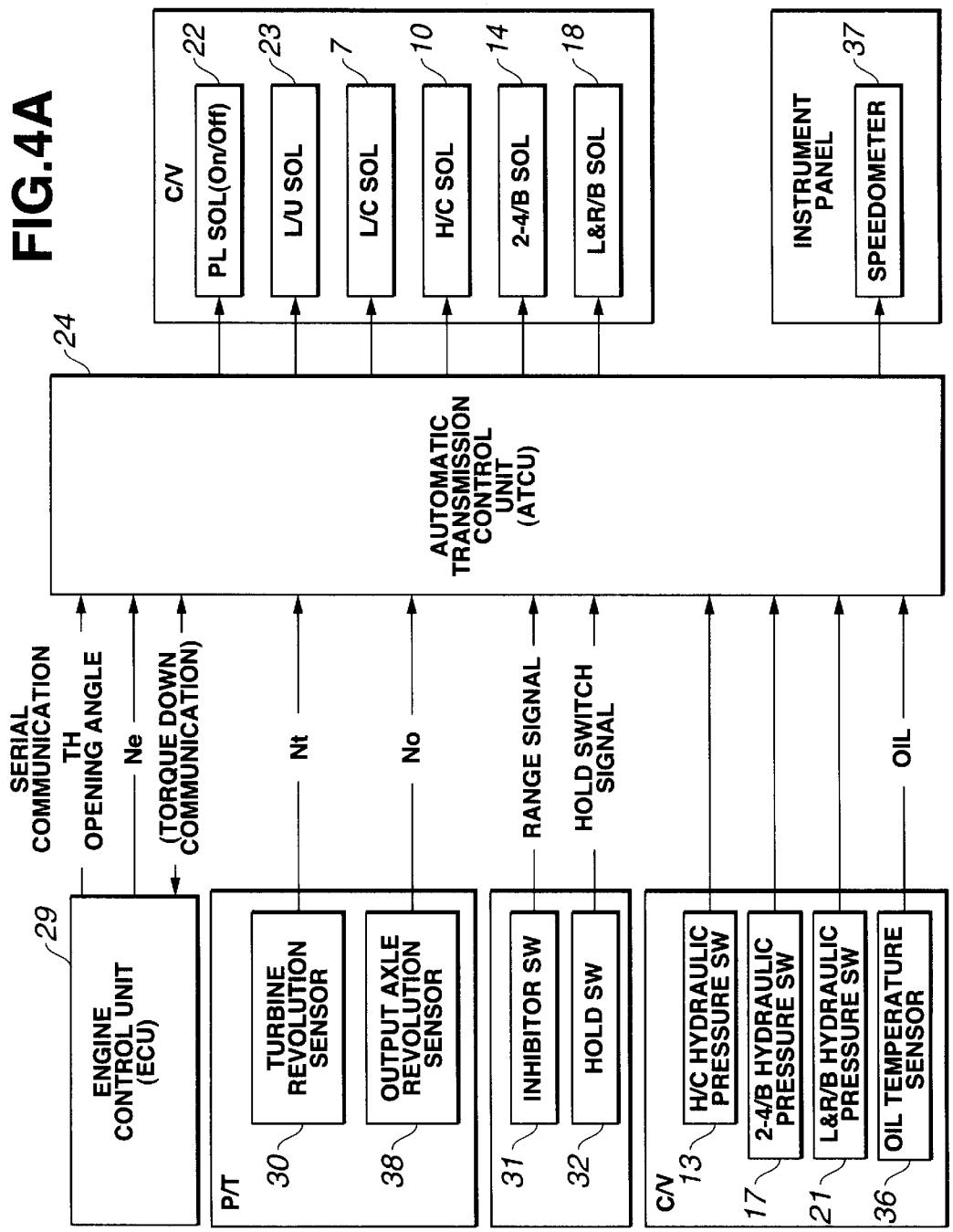
FIG. 4A is a schematic circuit block diagram of an electronic control system in the hydraulic control system in the hydraulic control system shown in FIG. 3.

FIG. 4A shows a gear control system of the vehicular automatic transmission to which the hydraulic control apparatus according to the present invention is applicable.

In FIG. 4A, a reference numeral 1 denotes a line pressure hydraulic passage, 2 denotes a manual valve, 3 denotes a D range pressure hydraulic passage, and 4 denotes an R range pressure hydraulic passage.

The manual valve 2 is a valve which can be switched according to a select operation into the D range in which a line pressure oil passage 1 and the D range pressure oil passage 3 are connected or into the D range in which the line pressure oil passage 1 and the D range pressure oil passage 3 are connected, and into the R range in which the line pressure oil passage 1 and the R range pressure passage 4 are connected.

In addition, in FIG. 4A, a reference numeral 5 denotes a pilot valve and 6 denotes a pilot pressure oil passage.

When the pilot valve 5 serves to perform a pressure decrease control over the line pressure from the line pressure oil passage 1 to a constant pilot pressure.

In addition, a reference numeral 7 shown in FIG. 4A denotes a duty ratio control low clutch solenoid which supplies a control pressure to a low clutch amplifier valve 8, produces a low clutch pressure from a D range pressure in a low clutch amplification valve 8, and introduces the low clutch via a low clutch pressure oil pressure passage 9.

A reference numeral 10 denotes a duty ratio control high clutch solenoid. The duty ratio control high clutch solenoid 10 supplies a control pressure for a high clutch amplifier valve 11. Then, the high clutch amplifier valve 11 produces the low clutch pressure from the D range pressure at the low clutch amplifier valve 8 and introduces the low clutch pressure to the low clutch L/C via the low clutch pressure oil passage 9. A high clutch oil pressure switch 13 is installed on the high clutch pressure oil passage 12. At the same time when the hydraulic is supplied to the high clutch, the hydraulic is supplied to a high clutch hydraulic switch 13 to turn the switch 13 ON.

A reference numeral 14 denotes a duty-ratio control 2–4 brake solenoid. The control pressure is supplied to a 2–4 brake solenoid. The control pressure is supplied to a 2–4 brake amplifier solenoid 15. A 2–4 brake pressure is produced at the 2–4 brake amplifier valve 15 from the D range pressure PD and is introduced via the 2–4 brake pressure oil passage 16 to the 2–4 brake 2–4/B. A 2–4 brake oil pressure switch 17 is installed on 2–4 brake pressure oil passage 16. At the same time when the hydraulic is supplied to the 2–4 brake, the hydraulic is supplied to the 2–4 brake hydraulic switch 17 to be turned ON, thus 1>ON.

A low & reverse brake solenoid 18 supplies the control pressure for the low & reverse brake amplifier valve 19. The low & reverse brake pressure is produced from the line pressure and is introduced to the low & reverse brake L & R/B via the low & reverse brake pressure oil passage 20.

A pressure control solenoid 22 of an on-and-off type switches the line pressure into two stages of a high pressure and a low pressure.

A duty-ratio lock-up solenoid 23 serves to control the engagement and release of the lock-up clutch.

An AT control unit (ATCU) 24 carries out various kinds of control operations including a gear shift control on the basis of the input information and outputs a solenoid drive current for each solenoid 7, 10, 14, 18, 22, and 23 according to the result of processing.

Then, a 2–4 brake first fail-safe valve 25 is hydraulic operating valve in which both of a fuel pressure PFP which is at any time acted upon one end of a spool(a hydraulic having the same value as a maximum pressure of a high clutch H/C engaged at a high-speed stage of the Drive range) and a low clutch pressure (L/CP) which is acted upon the other end of the spool serve as operation signal pressures. A 2–4 bake second fail-safe valve 26 is the hydraulic operating valve in which both of the fuel pressure PFP which is acted upon the one end of the spool and the high clutch pressure PH/C which is acted upon the other end of the spool serve as the operation signal pressures.

At a third-speed of the Drive range at which both of the low clutch and the high clutch pressures are simultaneously developed, the high clutch pressure is applied to the 2–4 brake second fail-safe valve 26 so that the low clutch pressure is applied to the 2–4 brake first fail-safe valve 25. Hence, since the D range pressure is drained, a 2–4 brake pressure is forcefully drained.

Figure 3:
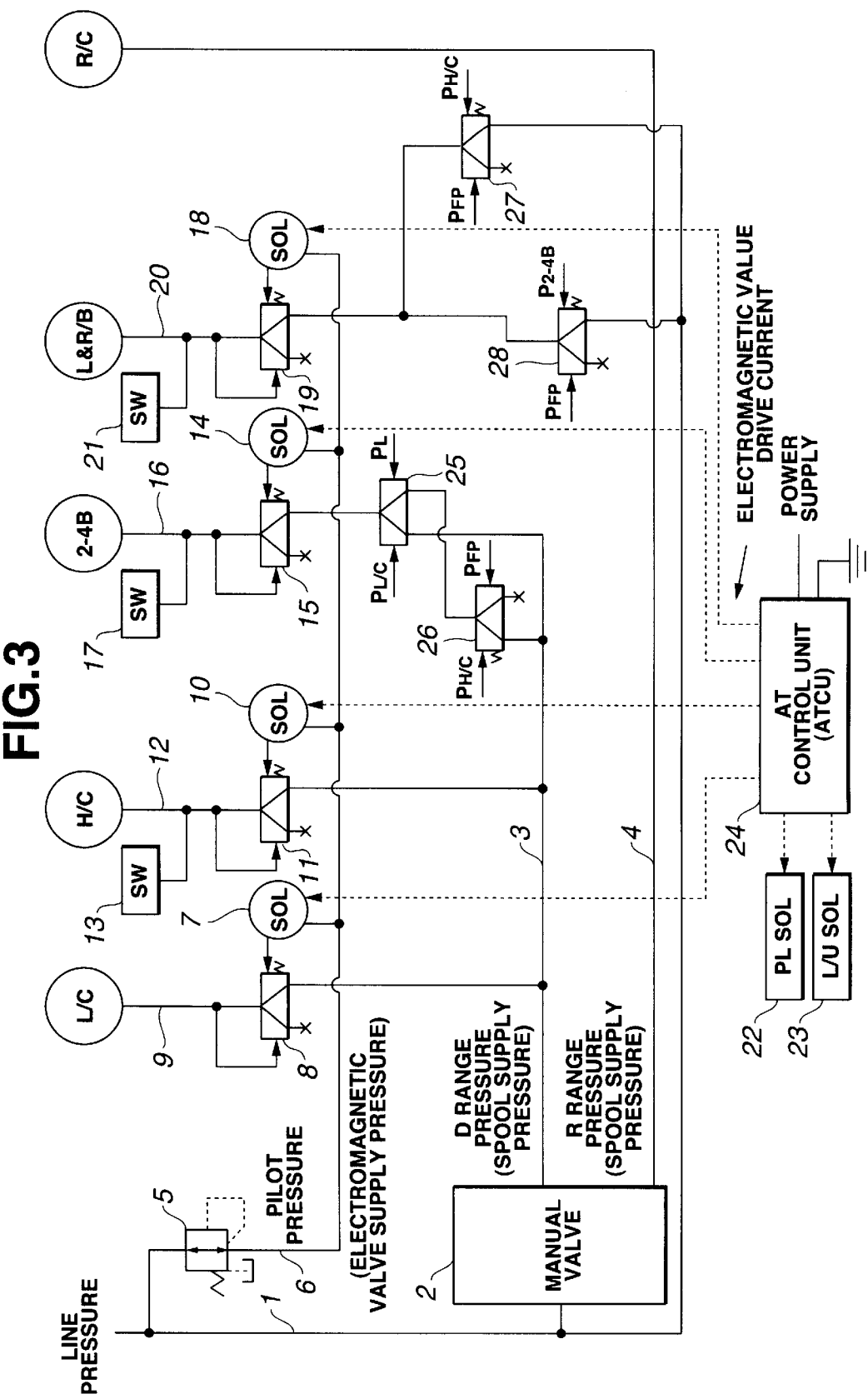
FIG. 3 is a hydraulic control system configuration view of the vehicular automatic transmission to which the failure detecting apparatus in the preferred embodiment is applicable.

In FIG. 3, a reference numeral 27 denotes a low-and-reverse brake first fail-safe valve and a reference numeral 28 denotes a low-and-reverse brake second fail-safe valve. In each of the low-and-reverse (L & R) brake first fail-safe valve 27 and the low-and-reverse brake second fail-safe valve 28, the fuel pressure PFP which is at any time acted upon the one end of the spool and either of the high clutch pressure PH/C or 2–4 brake pressure P2–4B serve as the operation signal pressures. In addition, each of the L & R brake first and second fail-safe valves 27 and 28 drains forcefully a line pressure so that the low-and-reverse brake pressure is drained at the $2^{nd}$-speed, $3^{rd}$-speed, and $4^{th}$-speed of the D range at which either one or both of the high clutch pressure P2–4/B is developed so that the L & R brake pressure is drained.

FIG. 4A is a schematic circuit block diagram representing an electronic control system of the hydraulic control operation for the automatic transmission in the preferred embodiment according to the present invention.

An engine control unit 29 transmits a throttle opening angle TH and an engine revolution speed Ne in terms of a serial transmission control unit 24 (abbreviated as ATCU). It is noted that a torque down (reduction of torque) communication is carried out between both engine control unit 29 and the automatic transmission unit ATCU 24. A turbine revolution speed Nt and an output axle revolution speed No from a turbine speed sensor 30 and an output axle speed sensor 38 in a power train P/T are inputted to the automatic transmission control unit (ATCU) 24.

An inhibitor switch 31 installed within the automatic transmission shown in FIG. 1 supplies a range signal to the ATCU 24 and a hold switch 32 installed within the automatic transmission shown in FIG. 1 outputs a hold switch signal to the ATCU 24. A high clutch hydraulic switch 13, a 2–4 brake hydraulic switch 17, and a low-and-reverse (L&R) brake switch 21 each installed in a control valve unit output switch signals representing hydraulic supply states on their corresponding engageable elements to the ATCU 24. An oil temperature signal is inputted from an oil temperature sensor 36.

A solenoid driver current is outputted from the ATCU 24 to each corresponding one of solenoids 7, 10, 14, 18, 22, and 23 and a speed display signal is outputted to a speedometer 37 disposed on an instrument panel.

FIG. 4B shows an internal circuit block diagram of the ATCU (automatic transmission control unit) 24.

In FIG. 4B, the ATCU 24 generally includes: a microprocessor (MPU) 24a, a timer interrupt controller 24b; a RAM (Random Access Memory) 24c; a ROM 24d(Read Only Memory);an Input Port 24e; an Output Port 24f; an input communication controller included in the input port 24e; and an output communication controller included in the output port 24f.

Next, an action in the hydraulic control apparatus in the preferred embodiment will be described below.

[Failure Detection Processing]

Figure 5:
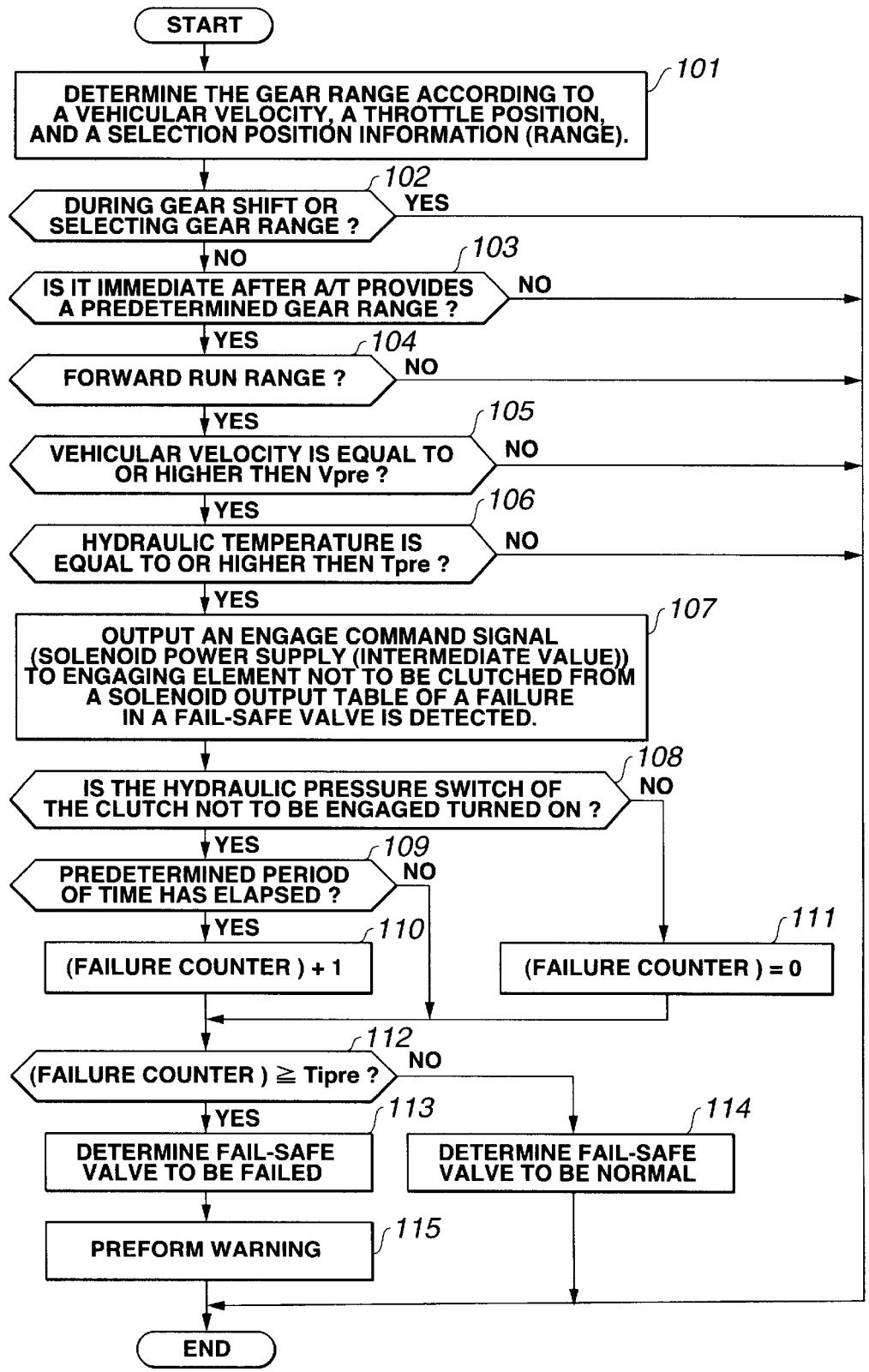
FIG. 5 is an operational flowchart representing a failure detection procedure executed in the automatic transmission control unit shown in FIG. 4A or 4B.

FIG. 5 is an operational flowchart on a failure detection processing of the hydraulic control apparatus in the preferred embodiment.

At a step 101, the ATCU 24 determines the present gear stage according to the vehicular velocity, throttle opening angle TH, and the select position information (range).

At the next step 102, the ATCU 25 determines whether the automatic transmission A/T falls in a gear shift position or a gear range select operation is being carried out.

If Yes at the step 101, the present routine is ended.

If No at step 102, the routine goes to a step 103.

At step 103, the ATCU 24 determines whether it is the immediate after the present gear stage is in a predetermined gear range.

If No at step 103, the present routine is ended.

If Yes at step 103, the present routine goes from step 103 to a step 104.

At step 104, the ATCU 24 determines if the present gear range falls in a forward run range.

If No at step 104, the present routine is ended.

If Yes at step 104, the present routine goes to a step 105.

At step 105, the ATCU 24 determines whether the vehicular velocity V is equal to or higher than a predetermined vehicular velocity Vpre.

If V<Vpre (No) at step 105, the present routine is ended.

If V≧Vpre (Yes) at step 105, the present routine goes to a step 106.

At step 106, the ATCU 24 determines whether the present oil temperature T is equal to or higher than a predetermined oil temperature Tpre.

If T<Tpre (No) at step 106, the present routine is ended.

At a step 107, the ATCU 24 outputs an engagement signal (a power supply to the corresponding solenoid (this is intermediate value) to any one of the clutches not to be engaged from a solenoid output table in case where the failure in any of the fail-safe values is detected.

At a step 108, the ATCU 24 determines whether the hydraulic switch of one of the clutches not to be engaged is turned on.

If not turned on (No) at step 108, the routine goes to a step 111.

If turned on (yes) at step 108, the routine goes to a step 109.

At step 109, the ATCU 24 determines whether a predetermined period of time has passed from a time at which the hydraulic switch ON state of one of the clutches which is not to be engaged. If No at step 109, the routine goes to step 112. If Yes at step 109,the routine goes to a step 110.

At step 110, a failure counter is incremented by one {(failure counter)+1} since the conditions at steps 108 and 109 are satisfied.

At step 111, the content of the failure counter is cleared to zero since the hydraulic switch ON condition at step 108 is not satisfied.

Then, at a step 112, the ATCU 24 determines if the number of counts in the failure counter is equal to or greater than a predetermined number of times Tipre.

If (failure counter)≧Tipre (Yes) at step 112, the routine goes to step 113. If (Failure counter)<Tipre (No) at step 112, the routine goes to a step 114.

At step 113, the ATCU 24 determines that the fail-safe valve has failed and the routine goes to a step 115.

At step 114, the ATCU 24 determines that the fail-safe valve operated normally.

At step 115, the ATCU 24 warns the vehicular occupant of the occurrence of failure in the fail-safe valve.

[Low & Reverse Brake Fail-safe Valve Failure Determination]

A case where the above-described failure detection processing is applied to a failure determination on the low-and-reverse brake first fail-safe valve 21 and the low-and-reverse second fail-safe valve 28 will be described in details below.

The gear stage is determined according to the vehicular velocity V, the opening angle of the throttle valve TH, and the select position information, as described at step 101 shown in FIG. 5, in order to confirm that the automatic transmission is neither in the gear shift operation nor in the select operation of the gear range.

This determination process is carried out because the hydraulic is not stable during the gear shift operation or during the select operation and, thus, the abnormality determination is difficult.

Next, the reason for the confirmation of whether the present time is immediate after the predetermined gear range and the present gear range falls in the forward run range (in this case, 2nd-speed, 3rd-speed, or the 4th-speed) will be described below.

That is to say, when the 2–4 brake (2–4/B) and the low-and-reverse brake (L & R/B) are simultaneously engaged or the high clutch and the low-and-reverse brake are simultaneously engaged, the interlock phenomenon occurs.

To prevent this interlock, when the 2–4 brake pressure is developed or the high clutch pressure is developed, the low-and-reverse brake first and second fail-safe valves 27 and 28 are operated to forcefully drain the low-and-reverse brake pressure. In other words, when the gear range indicates 2nd-speed, 3rd-speed, or 4th-speed, the low-and-reverse solenoid 18 is operated to engage the low-and-reverse brake. However, if the fail-safe valve 27 or 28 is normal, the low-and-reverse brake is not always engaged.

Figure 6:
FIG. 6 is a logic table representing a power supply or no power supply state of a low-and-reverse brake solenoid described in the preferred embodiment shown in FIG. 3.
Figure 6:
Figure 6:

When the above-described condition is satisfied, an engagement command signal is outputted to the low-and-reverse brake solenoid 18, as shown in FIG. 6, when the gear range indicates 2nd, 3rd, or 4th-speed.

Figure 7:
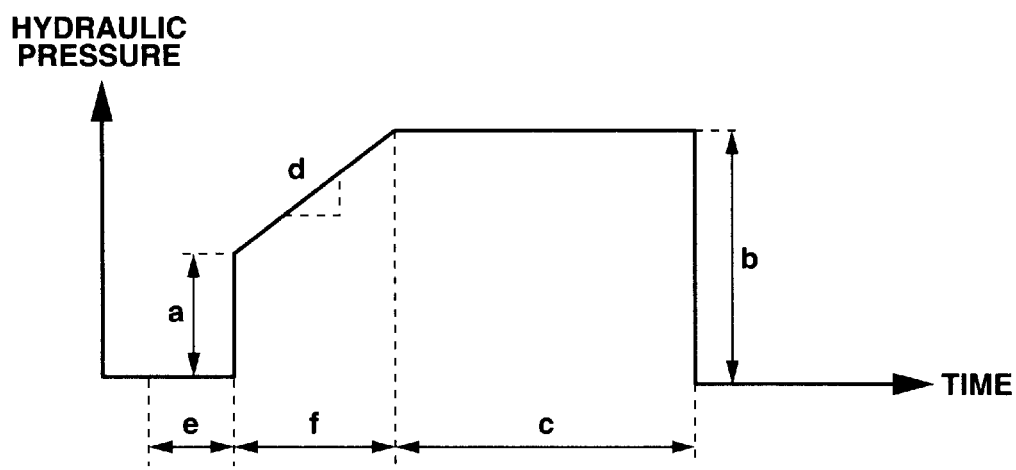
FIG. 7 is a characteristic graph representing an output hydraulic (power supply quantity) and a power supply time duration in the preferred embodiment.

FIG. 7 shows a time relationship between the power supply and the power supply duration of time.

In FIG. 7, although a lateral axis denotes the time and a longitudinal axis denotes the hydraulic, this hydraulic means that if the OFF output is carried out for the solenoid, what degree of the hydraulic is developed under the application of the normal hydraulic. Hence, at the 2nd-speed, 3rd-speed, or 4th-speed, if the low-and-reverse brake first and second fail-safe valves 27 and 28 operates normally, the hydraulic is not supplied to the low-and-reverse brake (L & R/B).

In FIG. 7, a denotes the hydraulic at which no hydraulic switch is turned on and b denotes the hydraulic at which the hydraulic switch is always turned on.

It is noted that the outputted hydraulic at which the low-and-reverse brake hydraulic switch 21 is turned on is the hydraulic to a degree slightly higher than a minimum pressure required to engage the low-and-reverse brake. Hence, even if the hydraulic were developed, the hydraulic is so weak that the clutch drags and no interlock occurs and the failure can be detected.

In addition, c in FIG. 7 denotes a time duration longer than a chattering time duration (a time duration which enables the influence of an oil vibration due to the occurrence in the duty ratio period to be eliminated), d in FIG. 7 denotes a ramp pressure, e denotes a delay time duration, and f denotes a time out of a ramp time.

It is noted that the time out f of the ramp time is to prevent an endless loop of the hydraulic control in a case where a gradient of the ramp pressure is small.

In a case where the hydraulic to b has not reached even if it takes the time of f, a region of c is forcefully transferred as the hydraulic of b.

Under the above-described state of c when the low-and-reverse brake hydraulic switch 21 turns to ON from OFF state (OFF→ON) and the turn on state of the switch 21 is detected continuously for 30 milliseconds, a once abnormal state is determined. If the twice abnormality determinations are made, the ATCU 24 can determine the failure in the fail-safe valve. Hence, the ATCU 24 can perform the warning for the vehicular driver of the warning.

The continuous twice failure detection to determine whether the fail-safe valve is abnormal is to prevent an erroneous detection.

In addition, when, in a midway through c, the automatic transmission control unit 24 detects that the low-and-reverse brake hydraulic switch 21 is turned from the ON state to the OFF state, the ATCU 24 does not issue the command to increment the failure counter by one in order to prevent the erroneous detection.

If is of course that the failure detection processing should be halted when the gear shift or the select control is carried out during the execution of such a processing as described above and the priority higher than the present control is taken for the other control.

While the gear range is the same, each fail-safe valve does not stick in a reverse direction spontaneously. It is not necessary to carry out the failure detection processing many times at irregular interval of time.

The specific failure detection of each of the two low-and-reverse (L & R) brake fail-safe valves 27 and 28 will be reviewed from the flowchart shown in FIG. 5.

Since, at the 3rd-speed range, the 2–4 brake pressure P2–4/B is not applied but the high clutch pressure PH/C is applied to the low-and-reverse brake first fail-safe valve 27, the line pressure is drained. At this stage, the power is supplied to the low-and-reverse solenoid 18. This power supply quantity corresponds to a pressure such that the above-described corresponding low-and-reverse brake hydraulic switch is turned on. At this time, if the low-and-reverse brake hydraulic switch 21 is turned on, the automatic transmission control unit 24 determines the failure of the low-and-reverse first fail-safe valve 27 and carries out the warning to the vehicular occupant.

Similarly, since, when the 2nd-speed range occurs, the high clutch pressure PH/C is not applied but the 2–4 brake pressure P2–4/B is applied to the above-described corresponding brake second fail-safe valve 28, the line pressure is drained. At this stage, the power supply to the 2–4 brake solenoid 14 as shown in FIG. 4 is carried out and the 2–4 brake hydraulic switch 17 is turned from OFF state to ON state (OFF→ON), the automatic transmission control unit 24 determines the occurrence of failure in the low-and-reverse brake second fail-safe valve 28 and carries out the warning to the vehicular occupant.

[Failure Determination of 2–4 brake fail-safe valve]

A case where the above-described processing shown in FIG. 5 is applied to the failure determination of the 2–4 brake first and second fail-safe valves 25 and 26 will be described below.

However, a basic process flow is generally the same as described with respect to the case of the above-described low-and-reverse brake first and second fail-safe valves 27 and 28. Hence, a difference point from the case of the valves 27 and 28 will be described.

The reason for the confirmation that the automatic transmission falls in the forward run range (in this case, 3rd-speed) immediately after the predetermined gear range is entered will be described below.

That is to say, when the 2–4 brake occurs, the high clutch and the low clutch are simultaneously engaged, the interlock phenomenon occurs.

To prevent this interlock, when the high clutch pressure PH/C and the low clutch pressure PL/C are developed simultaneously, the 2–4 brake first and second fail-safe valve 25 and 26 cause the 2–4 brake pressure to forcefully be drained.

In details, when the gear stage is at the 3-rd speed range, the 2–4 brake solenoid 14 is operated. Even if 2–4 brake is tried to be engaged, the 2–4 brake is always not engaged provided that the fail-safe valves 25 and 26 are normal.

When the above-described condition is satisfied, the engagement command signal is outputted to the 2–4 brake solenoid 14 at the time of 3rd-speed range as shown in FIG. 8.

The specific failure detection on the 2–4 brake fail-safe valves 25 and 26 will be described below with reference to the flowchart shown in FIG. 5.

Under the 3rd-speed range, the 2–4 brake pressure P2–4/B is not applied but the high clutch pressure PH/C is applied so that the low clutch pressure PL/C is applied to the 2–4 brake first fail-safe valve 25. The application of the low clutch pressure PL/C causes the D range pressure at the 2–4 brake first fail-safe valve to be drained.

At this stage, the power is supplied to the 2–4 brake solenoid 14. The power supply quantity, at this time, corresponds to the pressure enough to turn on the above-described corresponding hydraulic switch (the 2–4 brake hydraulic switch 17).

When the 2–4 brake hydraulic switch 17 is turned on, the automatic transmission control unit 24 determines that either the 2–4 brake first or second fail-safe valve 25 or 26 has failed and issues the warning to the vehicular occupant.

According to the failure detection on the above-described fail-safe valves, the automatic transmission control unit 24 always monitors that each fail-safe valve is operated without failure in order to generate the interlock even if a winding of each solenoid is broken.

Such a failure that cannot conventionally be detected (so-called, a sleeping fail) becomes undetectable. Furthermore, the occurrence of failure is informed to the vehicular occupant. A frequency of the interlock can be reduced by carrying out a fail-safe on a double failure when another failure occurs. A safety level can be improved.

It is noted that, although, in the preferred embodiment described above, two valves are exemplified as the fail-safe valves, a single valve or three or more valves may constitute the fail-safe valves.

The entire contents of a Japanese Patent Application No. Heisei 11-223337 (filed in Japan on Aug. 6, 1999) are herein incorporated by reference. Although the invention has been described above by reference to certain embodiment of the invention, the invention is not limited to the embodiments described above. Modifications and variations of the embodiments described above will occur to those skilled in the art in the light of the above teachings. The scope of the invention is defined with reference to the following claims.

What is claimed is:

1. A vehicular automatic transmission, comprising:
    a plurality of engaging elements;
    a shift gear mechanism in which combinations of engagement and release of the respective engaging elements are selected by means of hydraulic control section so as to perform a multiple range of gear shift;
    a hydraulic switching device that is installed in the hydraulic control section to prevent the shift gear mechanism from being interlocked; and
    a failure detecting apparatus to detect an occurrence of failure of the hydraulic switching device, the failure detecting apparatus including:
    a gear range determinator to determine in which gear range the present gear range of the automatic transmission falls;
    a failure detection start determinator to determine a start of the failure detection of the hydraulic switching device according to a result of determination by the gear range determinator;
    a memory storing parts of the engaging elements which are selected as the combinations of engagement for the respective gear ranges and other parts than those for the respective gear ranges in a table form;
    a hydraulic switching device checking device to intentionally output an engagement command signal to command to engage to each of the other parts of engaging elements which are not to be engaged and which are read from the memory; and
    a hydraulic switching device abnormality state determinator to determine through the checking device whether the hydraulic switching device is in an abnormal state depending on whether the hydraulic is transmitted to a corresponding one of the other parts of engaging elements in response to the engagement command signal.

2. A vehicular automatic transmission as claimed in claim 1, wherein the hydraulic switching device abnormality state determinator determines a state of the hydraulic switching device according to a state of a hydraulic switch installed in a hydraulic circuit of the hydraulic control section linked to the corresponding one of the other parts of the engaging elements which are not to be engaged.

3. A vehicular automatic transmission as claimed in claim 2, wherein the hydraulic switch is turned on on condition that the hydraulic in the hydraulic circuit is set to be higher by a predetermined pressure than a minimum pressure required for the corresponding one of the other parts of engaging elements which are not to be engaged but is set to be lower than its maximum pressure.

4. A vehicular automatic transmission as claimed in claim 1, wherein the failure detection start determinator inhibits the start of the hydraulic device failure detection while the automatic transmission is carrying out a gear range shift operation and while the gear range is being selected.

5. A vehicular automatic transmission as claimed in claim 1, wherein the failure detection start determinator starts the failure detection of the hydraulic switching device to carry out the failure detection thereof only once when the present gear range falls in a predetermined gear range.

6. A vehicular automatic transmission as claimed in claim 1, wherein the failure detection determinator determines to start the failure detection of the hydraulic switching device only when an oil temperature is equal to or higher than a predetermined temperature value.

7. A vehicular automatic transmission as claimed in claim 1, wherein the failure detection start determinator determines to start the failure detection of the hydraulic switching device only when a vehicular velocity is equal to or higher than a predetermined vehicular velocity.

8. A vehicular automatic transmission as claimed in claim 1, wherein the failure start determinator determines to start the failure detection of the hydraulic switching device only when the present gear range is a forward run range.

9. A vehicular automatic transmission as claimed in claim 1, wherein the failure detection apparatus once halts the present failure detection of the hydraulic switching device when the gear range shift operation or the gear range select operation occurs while carrying out the failure detection of the hydraulic switching device.

10. A vehicular automatic transmission as claimed in claim 1, wherein the hydraulic switching device is a hydraulic switching valve and the abnormal state determinator determines that the hydraulic switching valve is in the abnormal state when the abnormal state of the hydraulic switching valve determined by the abnormal state determinator is continued for a predetermined period of time.

11. A vehicular automatic transmission as claimed in claim 10, wherein the abnormal state determinator includes a failure counter which is incremented by one whenever the abnormal state determinator determines that the abnormal state of the hydrauic switching valve is held continuously for the predetermined period of time and wherein the failure determinator determines that the hydraulic switching valve is in the abnormal state when a count value of the failure counter has reached to a predetermined count value.

12. A vehicular automatic transmission as claimed in claim 11, wherein, when the failure determinator once determines that the hydraulic switching valve is in a normal state before the count value of the failure counter has reached to the predetermined count value, the count value of the failure counter is cleared.

13. A vehicular automatic transmission as claimed in claim 1, further comprises a warning unit that serves to inform a vehicular occupant of the abnormal state of the hydraulic switching device determined by the abnormal state determinator.

14. A vehicular automatic transmission as claimed in claim 3, wherein one of the other parts of engaging elements which are not to be engaged corresponds to a low-and-reverse brake (L & R/B) when the present range falls in either a second-speed or third-speed range, the hydraulic switch corresponds to a low-and-reverse brake switch (21), and the checking device outputs the engagement command signal to a low-and-reverse brake solenoid (18) and wherein the hydraulic switching device is a low-and-reverse first fail-safe valve (27) when the present gear range falls in the third-speed range.

15. A vehicular automatic transmission as claimed in claim 3, wherein one of the other parts of engaging elements which are not to be engaged corresponds to a low-and-reverse brake (L & R/B) when the present range falls in either a second-speed or third-speed range, the hydraulic switch corresponds to a 2–4 brake hydraulic switch (17), and the checking device outputs the engagement command signal to a 2–4 brake solenoid (14) and wherein the hydraulic switching device is a low-and-reverse second fail-safe valve (28) when the present gear range falls in the second-speed range.

16. A vehicular automatic transmission as claimed in claim 3, wherein one of the other parts of engaging elements which are not to be engaged corresponds to a 2–4 brake (2–4/B) when the present range falls in a third-speed range, the hydraulic switch corresponds to a 2–4 brake switch (17), and the checking device outputs the engagement command signal to a 2–4 brake solenoid (14) and wherein the hydraulic switching device is a 2–4 first or second fail-safe valve (25, 26) when the present gear range falls in the third-speed range.

* * * * *